United States Patent
Zhou et al.

(10) Patent No.: US 9,860,512 B2
(45) Date of Patent: Jan. 2, 2018

(54) DISPLAY APPARATUS AND IMAGE DISPLAY METHOD THEREOF

(71) Applicants: Novatek (Shanghai)Co., Ltd., Shanghai (CN); Novatek Microelectronics Corp., Hsinchu (TW)

(72) Inventors: Lei Zhou, Shanghai (CN); Heng Yu, Shanghai (CN); Guang-Zhi Liu, Shanghai (CN); Chun Wang, Shanghai (CN)

(73) Assignees: Novatek (Shanghai) Co., Ltd., Shanghai (CN); Novatek Microelectronics Corp., Hsinchu (TW)

(*) Notice: Subject to any disclaimer, the term of this patent is extended or adjusted under 35 U.S.C. 154(b) by 427 days.

(21) Appl. No.: 13/925,847

(22) Filed: Jun. 25, 2013

(65) Prior Publication Data

US 2014/0313286 A1 Oct. 23, 2014

(30) Foreign Application Priority Data

Apr. 17, 2013 (CN) .......................... 2013 1 0132720

(51) Int. Cl.
*H04N 13/00* (2006.01)
(52) U.S. Cl.
CPC ... *H04N 13/0029* (2013.01); *H04N 2213/007* (2013.01)
(58) Field of Classification Search
CPC ..................... H04N 13/0029; H04N 2213/007
USPC .......................................................... 348/43
See application file for complete search history.

(56) References Cited

U.S. PATENT DOCUMENTS

| 6,366,706 B1* | 4/2002 | Weitbruch ........... H04N 7/0122 348/441 |
| 8,120,706 B1* | 2/2012 | Verbeck ................... H04N 5/44 348/556 |
| 8,731,285 B1* | 5/2014 | Hundemer ............. H04N 17/00 382/165 |

(Continued)

FOREIGN PATENT DOCUMENTS

| CN | 101605271 | 12/2009 |
| CN | 101753877 | 6/2010 |

(Continued)

OTHER PUBLICATIONS

"Office Action of Taiwan Counterpart Application", dated Oct. 27, 2014, p. 1-p. 12.

(Continued)

*Primary Examiner* — Mohammed Rahaman
*Assistant Examiner* — James Boylan
(74) *Attorney, Agent, or Firm* — JCIPRNET (57) ABSTRACT

A display apparatus and an image display method of the display apparatus are provided, and the image display method includes following steps. Video contents that include a plurality of single frame images are received. A detection zone of the single frame images is determined according to a current scale mode of the display apparatus, and the different scale modes correspond to the different detection zones. The detection zone of each single frame image is detected to determine an image format of the video contents. A play mode of the display apparatus is adjusted according to the image format, and the video contents which are scaled are displayed by the display apparatus in the play mode.

18 Claims, 6 Drawing Sheets

(56) References Cited

U.S. PATENT DOCUMENTS

| | | | |
|---|---|---|---|
| 2004/0251842 A1* | 12/2004 | Kubota | G09G 5/10 315/169.3 |
| 2007/0040941 A1* | 2/2007 | Lin | H04N 7/0122 348/556 |
| 2007/0297513 A1* | 12/2007 | Biswas | H04N 7/014 375/240.16 |
| 2008/0084503 A1* | 4/2008 | Kondo | G09G 5/005 348/556 |
| 2011/0032330 A1* | 2/2011 | Kim | H04N 13/0029 348/43 |
| 2011/0122127 A1* | 5/2011 | Ko | H04N 13/0029 345/419 |
| 2011/0141230 A1* | 6/2011 | Bai | H04N 13/0007 348/43 |
| 2012/0314028 A1* | 12/2012 | Bruls | H04N 13/0003 348/43 |
| 2013/0113883 A1* | 5/2013 | Kanemaru | G09G 3/20 348/43 |
| 2013/0145395 A1* | 6/2013 | Jeong | H04N 5/50 725/40 |
| 2013/0162769 A1* | 6/2013 | Zhou | H04N 5/14 348/43 |
| 2013/0194493 A1* | 8/2013 | Knee | H04N 7/0122 348/445 |
| 2013/0293673 A1* | 11/2013 | Hrebien | H04N 5/46 348/43 |
| 2014/0022240 A1* | 1/2014 | Lee | G06T 19/20 345/419 |
| 2015/0058877 A1* | 2/2015 | Lakkundi | H04N 21/439 725/19 |
| 2015/0070371 A1* | 3/2015 | Poddar | G06T 1/60 345/552 |

FOREIGN PATENT DOCUMENTS

| | | |
|---|---|---|
| CN | 101980545 | 2/2011 |
| CN | 101980545 A * | 2/2011 |
| CN | 102238432 A * | 11/2011 |
| CN | 102298708 | 12/2011 |
| CN | 102316338 | 1/2012 |
| CN | 102395037 A * | 3/2012 |
| CN | 102447939 | 5/2012 |
| CN | 102833566 | 12/2012 |
| CN | 102970555 | 3/2013 |
| CN | 103024318 | 4/2013 |
| CN | 103053165 | 4/2013 |
| JP | 2010068309 | 3/2010 |

OTHER PUBLICATIONS

"Office Action of China Counterpart Application", dated Nov. 4, 2015, p. 1-p. 8.

* cited by examiner

DISPLAY APPARATUS AND IMAGE DISPLAY METHOD THEREOF

CROSS-REFERENCE TO RELATED APPLICATION

This application claims the priority benefit of China application serial no. 201310132720.9, filed on Apr. 17, 2013. The entirety of the above-mentioned patent application is hereby incorporated by reference herein and made a part of this specification.

BACKGROUND OF THE INVENTION

Field of the Invention

The invention relates to a display apparatus and an image display method thereof; more particularly, the invention relates to a display apparatus with a play mode which is adjustable by detecting a format of video contents and an image display method of the display apparatus.

Description of Related Art

With the progress of science and technology, three-dimensional (3D) images have led the latest development trend following the development of high definition (HD) images. Compared to the conventional two-dimensional (2D) flat display technology, the 3D stereo display technology presents vivid visual experience. Thanks to the maturity of display technology, the recent 3D stereo displays have been significantly improved in terms of stereoscopy and comfort of viewers, as compared to the conventional displays. Besides, 3D shooting systems for providing 3D video contents have been available on the market, which allows the evolvement of 3D display industry and may lead to future popularity of 3D films and 3D displays. From another perspective, in consideration of market demands, the 3D stereo displays are required to display not only the 3D stereo images but also the 2D images.

Hence, the current 3D image display systems are able to display both the 3D stereo images and the conventional 2D images. The images in various formats must be displayed by the image display systems in different manner; otherwise, the displays are unlikely to exhibit the images correctly and appropriately. For instance, if 3D images with a side by side format are displayed in the same manner as that of displaying 2D images, the image frame on the image display system is divided into two parts, i.e., the left half section and the right half section, which may cause inconvenience to users of the displays. Therefore, in view of different image types and formats, the display apparatus needs to correctly detect the format of an image to be displayed, and the user is required to manually adjust the display apparatus to be in a proper play mode, so as to correctly and appropriately display the image. As a result, how to spontaneously detect an image format of video contents in an efficient manner and display the 3D stereo images or the 2D images with ease has drawn attention from people skilled in the pertinent art.

SUMMARY OF THE INVENTION

The invention is directed to a display apparatus and an image display method thereof. Through detection of an image format of video contents, the way to display an image may be adjusted, and thereby users of the display apparatus are allowed to observe 3D stereo images with ease.

In an embodiment of the invention, an image display method of a display apparatus is provided, and the image display method includes following steps. Video contents that include a plurality of single frame images are received. A detection zone of the single frame images is determined according to a current scale mode of the display apparatus, and the different scale modes correspond to the different detection zones. The detection zone of each of the single frame images is detected to determine an image format of the video contents. A play mode of the display apparatus is adjusted according to the image format, and the video contents which are scaled are displayed by the display apparatus in the play mode.

According to an embodiment of the invention, the step of adjusting the play mode of the display apparatus according to the image format includes: directly setting the current play mode corresponding to the image format of the video contents.

According to an embodiment of the invention, the step of adjusting the play mode of the display apparatus according to the image format includes: determining a preset play mode of the display apparatus according to the image format; determining whether to set the current play mode as the preset play mode according to a user's command.

According to an embodiment of the invention, the step of determining whether to set the current play mode as the preset play mode according to the user's command includes: displaying a mode-switching hint on a screen. If the display apparatus receives the user's command, the current play mode is switched to the play mode corresponding to the user's command. If the display apparatus does not receive the user's command, the current play mode of the display apparatus is kept to be the preset play mode.

According to an embodiment of the invention, the step of determining whether to set the current play mode as the preset play mode according to the user's command includes: displaying a plurality of 3D image play modes on a screen when the user's command corresponds to 3D image display; setting one of the 3D image play modes as the preset play mode according to the image format; setting the current play mode as the preset play mode.

According to an embodiment of the invention, the image display method further includes: displaying an image-switching hint on a screen; after the display apparatus receives the user's command, converting 2D single frame images of the single frame images into 3D images or converting 3D single frame images of the single frame images into 2D images.

According to an embodiment of the invention, the image display method further includes: adjusting the scale mode according to the image format corresponding to the video contents.

According to an embodiment of the invention, the step of determining the detection zone of the single frame images includes: setting four corner areas of each of the single frame images as the detection zone when the scale mode is at a 16:9 aspect ratio; setting a central area of each of the single frame images as the detection zone when the scale mode is at a 4:3 aspect ratio; setting all areas of each of the single frame images as the detection zone when the scale mode is a dot-by-dot scale mode.

According to an embodiment of the invention, the step of determining the detection zone of the single frame images includes: dividing the detection zone into a plurality of sub-zones and calculating eigenvalues of the sub-zones; determining the image format of the video contents according to the eigenvalues of the sub-zones.

In another embodiment of the invention, a display apparatus that includes a display panel, a front-end image processing unit, a format detection unit, and a processing and driving unit is provided. The display panel is configured for displaying video contents. The front-end image processing unit receives the video contents which include a plurality of single frame images, and the front-end image processing unit scales the single frame images according to a current scale mode of the display apparatus. The format detection unit is coupled to the front-end image processing unit. According to the current scale mode of the display apparatus, the format detection unit determines a detection zone of the single frame images. Here, the different scale modes correspond to the different detection zones, and the format detection unit detects the detection zone of each of the single frame images to determine an image format of the video contents. The processing and driving unit is coupled to the format detection unit and the display panel. According to the image format, the processing and driving unit adjusts a play mode of the display apparatus and drives the display panel of the display apparatus in the play mode to display the video contents. Here, the video contents are scaled and then displayed.

In view of the above, according to the display apparatus and the image display method thereof as described in an embodiment of the invention, it can be determined whether the video contents are in the 2D format or in the 3D format by spontaneously detecting the image format of the video contents. Moreover, based on the image format of the video contents or the user's command, the ideal way to display images may be determined, such that users of the display apparatus are able to observe the 3D stereo images through performing a streamlined operation process.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

At present, 3D stereo images have various image formats, and thus displays or image display systems are required to display these 3D stereo images (with various image formats) in different manner. In addition, since the displays or the image display systems support both the 2D image format and the 3D image format, in order to accurately display the image frames to be observed by users, the displays or the image display systems must be adjusted to be in a proper play mode in response to the image format of the to-be-displayed video contents. Accordingly, a method of detecting an image format applicable to a display apparatus or an image display system is provided herein, such that the display apparatus is allowed to display the image frame as is expected by the users. To further explain the invention and enable a person having ordinary skill in the art to carry out the invention, several embodiments are provided below.

Figure 1:
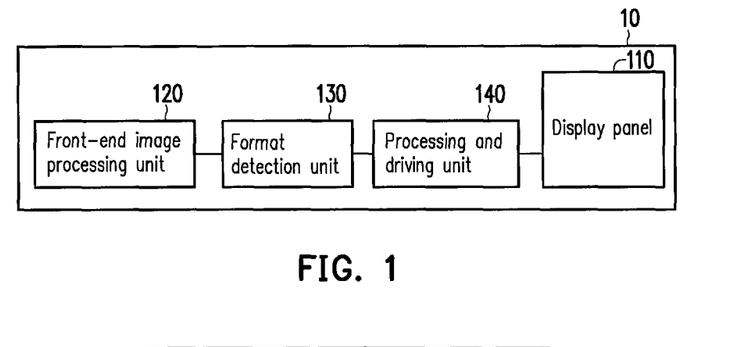
FIG. 1 is a systematic diagram schematically illustrating a display apparatus according to an embodiment of the invention.

FIG. 1 is a systematic diagram schematically illustrating a display apparatus according to an embodiment of the invention. With reference to FIG. 1, in the present embodiment, the display apparatus 10 includes a display panel 110, a front-end image processing unit 120, a format detection unit 130, and a processing and driving unit 140. The display apparatus 10 is, for instance, a liquid crystal display (LCD), a light-emitting diode (LED) display, an organic light-emitting diode (OLED) display, or any other display apparatus which displays an image frame after receiving video contents from an image source. Thus, the display panel 110 may be an LCD panel, an LED display panel, and OLED display panel, or any other display panel for broadcasting or displaying the video contents.

The front-end image processing unit 120 serves to process an image through adjusting image contrast, image brightness, or image chromaticity. Besides, the front-end image processing unit 120 may scale the image when the display apparatus 10 is in a specific scale mode. The format detection unit 130 is coupled to the front-end image processing unit 120 for determining an image format of the video contents. Note that the front-end image processing unit 120 and the format detection unit 130 may be in form of software, hardware, or a combination thereof, which should not be construed as a limitation to the invention. The software is, for instance, a source code, application software, a driver, a software module, or a function capable of performing certain functions. The hardware is, for instance, a central processing unit (CPU), a programmable controller, a digital signal processor (DSP), or a programmable microprocessor for a common purpose or a special purpose.

The processing and driving unit 140 is coupled to the format detection unit 130 and the display panel 110. According to the image format of the video contents, the processing and driving unit 140 adjusts a play mode of the display apparatus 10. Moreover, based on the play mode, the processing and driving unit 140 decodes the video contents and drives the display panel 110 according to the decoded video contents, such that the display panel 110 can display the scaled video contents. In some embodiments of the invention, the processing and driving unit 140 may include a timing controller, a source driver, and/or a gate driver.

Figure 2:
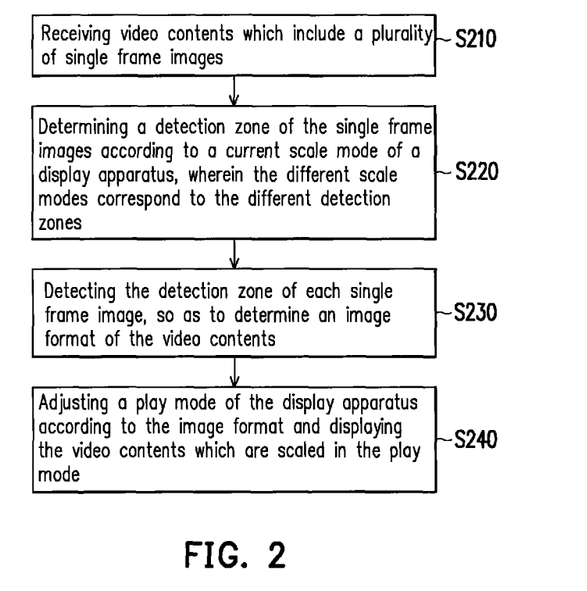
FIG. 2 is a flowchart of an image display method according to an embodiment of the invention.

FIG. 2 is a flowchart of an image display method according to an embodiment of the invention. With reference to FIG. 1 and FIG. 2, the image display method described in the present embodiment is applicable to the display apparatus 10, and detailed steps of the image display method are described hereinafter with reference to components in the display apparatus 10.

In the present exemplary embodiment, note that the types of the image formats are categorized according to a specific categorization principle. To be specific, the normal home edition 3D image format includes but is not limited to a side by side (SBS) format, a top and bottom (TB) format, a line by line (LBL) format, a chessboard (CB) format, a 3D title format (TF), a frame sequence (FS) format, and a frame packing (FP) format. The display apparatus 10 is not only required to determine whether the current video contents are in the 3D image format but also required to determine whether the current video contents are in the 2D image format. Here, the LBL format and the CB format in the 3D image format category are very similar to the 2D image format and cannot be easily differentiated with naked eyes. To distinguish the LBL format and the CB format in the 3D image format category from the 2D image format, it is likely to categorize the LBL format and the CB format in the 3D image format category and the 2D image format into different groups, so as to prevent the incapability of determination or erroneous determination of the image format. Table 1 serves to exemplify the categorization of the image formats. As exhibited in Table 1, the image formats are categorized into four groups: the 2D image format is categorized into group 1, the LBL image format in the 3D image format category is categorized into group 2, the CB image format in the 3D image format category is categorized into group 3, and group 4 neither contains the LBL image format and the CB image format in the 3D image format category nor includes the 2D image format. Simply put, if the categorization manner shown in Table 1 is adopted, the LBL image format, the CB image format, and the 2D image format can be separated from one another. Note that Table 1 and the categorization manner shown therein are exemplary, and each group or category may include the image formats different from those described herein.

TABLE 1

| Group | Image Format |
| --- | --- |
| Group 1 | SBS, TB, FS, FP, TF, 2D |
| Group 2 | SBS, TB, FS, FP, TF, LBL |
| Group 3 | SBS, TB, FS, FP, TF, CB |
| Group 4 | SBS, TB, FS, FP, TF |

If the display apparatus 10 adopts the categorization manner of group 1, the display apparatus 10 detects the video contents and determines whether the video contents are in one of the image formats in group 1. The groups 1 to 4 may be selected from plural groups according to the user's command or may be configured in advance, which should not be construed as a limitation to the invention. The detailed steps of the image display method are further elaborated hereinafter. With reference to FIG. 2, in step S210, the front-end image processing unit 120 receives the video contents which include a plurality of single frame images. For instance, the front-end image processing unit 120 may receive television video contents from a television signal source, commercial/broadcast video contents output by a commercial/broadcast host, or video contents output by a multifunctional DVD player, which should not be construed as a limitation to the invention.

In step S220, the format detection unit 130 determines a detection zone of each of the single frame images according to a current scale mode of the display apparatus 10; here, the different scale modes correspond to the different detection zones. In general, the display panels with different sizes correspond to different scale modes of the display apparatus, and the front-end image processing unit 120 employs a corresponding scale mode, such that the scaled single frames comply with the dimensions of the corresponding display panel; alternatively, under supported by the display apparatus, the users may select any desired scale mode so as to display the image with the corresponding display dimension. However, after the single frames are scaled, the display dimension of the scaled single frames may be changed, which may affect the determination of the image format. To ensure that the determination result is favorable, the format detection unit 130 determines the detection zone corresponding to different scale modes, respectively. How to detect the detection zone of each of the single frame images is elaborated below.

Figure 3A:
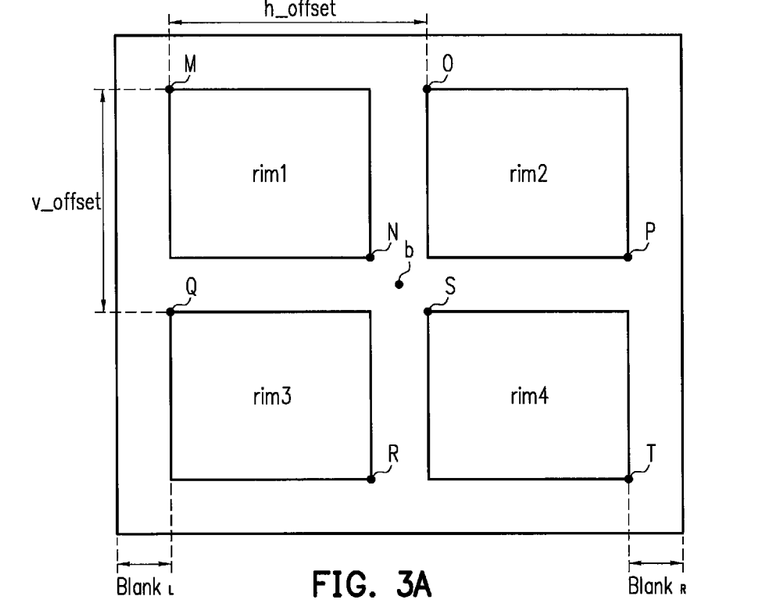
FIG. 3A to FIG. 3D are schematic diagrams illustrating a detection zone at different scale ratios according to an embodiment of the invention.

FIG. 3A to FIG. 3D are schematic diagrams illustrating a detection zone at different scale ratios according to an embodiment of the invention. As shown in FIG. 3A, the detection zone of the single frame image is divided into four sub-zones rim1 to rim4. Each of the sub-zones rim1 to rim4 occupies the same area, and the starting point and the end point of each of the sub-zones rim1 to rim4 are defined below: the coordinate of the starting point M of the sub-zone rim1 is (rim1_h0, rim1_v0), and the coordinate of the end point N of the sub-zone rim1 is (rim1_h1, rim1_v1); the coordinate of the starting point O of the sub-zone rim2 is (rim1_h0+h_offset, rim1_v0), and the coordinate of the end point P of the sub-zone rim2 is (rim1_h1+h_offset, rim1_v1); the coordinate of the starting point Q of the sub-zone rim3 is (rim1_h0, rim1_v0+v_offset), and the coordinate of the end point R of the sub-zone rim3 is (rim1_h1, rim1_v1+v_offset); the coordinate of the starting point S of the sub-zone rim4 is (rim1_h0+h_offset, rim1_v0+v_offse), and the coordinate of the end point T of the sub-zone rim4 is (rim1_h1+h_offset, rim1_v1+v_offset).

After the single frame image is scaled, the coordinates of the sub-zones rim1 to rim4 are calculated in the following manner. It is assumed that the horizontal scaling ratio is t %, a point b is set as the center point for scaling the single frame image, and the original width of the single frame image is defined as "width". After the single frame image is scaled, the coordinate of the left edge of the single frame image is "(0−b)*t %+b", and the coordinate of the right edge of the single frame image is "(width−b)*t %+b". The distance $Blank_L$ from the left edge of the single frame image to the left frame of the screen is shown in the following equation (1):

$$Blank_L = b*(1-t\%) \quad (1)$$

The distance $Blank_R$ from the right edge of the single frame image to the right frame of the screen is shown in the following equation (2):

$$Blank_R = (width-b)*(t\%-1) \quad (2)$$

Accordingly, the horizontal coordinate of the starting point M of the sub-region rim1 is shown in the following equation (3):

$$rim1\_h0 = max(0, Blank_L) \quad (3)$$

The horizontal coordinate of the end point N of the sub-region rim1 is shown in the following equation (4):

$$rim1\_h1 = width/2 - max(0, Blank_R) \quad (4)$$

The horizontal offset h_offset is shown in the following equation (5):

$$h\_offset = width/2 + max(0, -Blank_L) - rim\_h0 \quad (5)$$

Since the calculation manner of the vertical coordinate is similar to that of the horizontal coordinate, no further description in this regard is provided hereinafter. Through said calculation, the coordinates of the sub-zones rim1 to rim4 of the single frame image are determined.

Figure 3B:
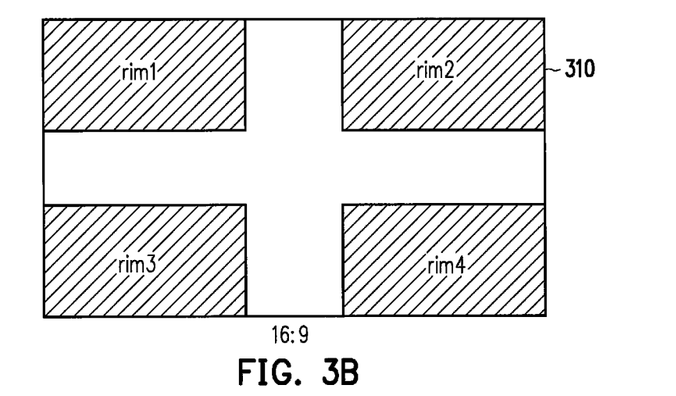
Figure 3C:
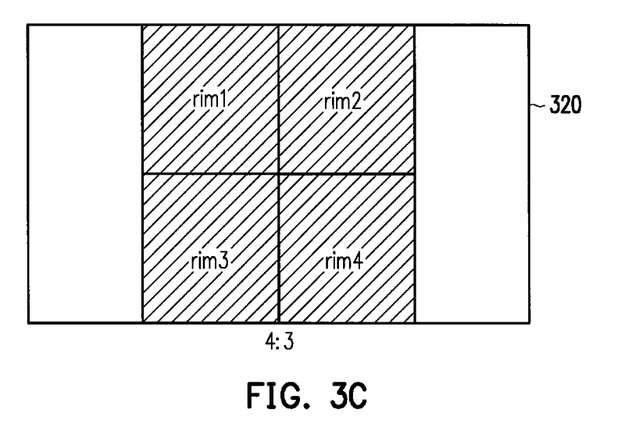
Figure 3D:
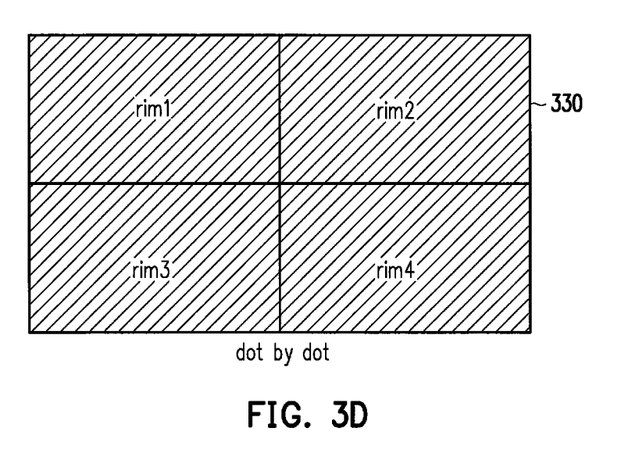

As illustrated in FIG. 3B, when the scale mode is at a 16:9 aspect ratio, the format detection unit 130 selects four corner areas of the single frame image 310 as the detection zone. As illustrated in FIG. 3C, when the scale mode is at a 4:3 aspect ratio, the format detection unit 130 selects a central area of the single frame image 320 as the detection zone. As illustrated in FIG. 3D, when the scale mode is a dot-by-dot scale mode, the format detection unit 130 selects all areas of the single frame image 330 as the detection zone.

In step S230, the format detection unit 130 detects the detection zone of the single frame image, so as to determine an image format of the video contents. In an exemplary embodiment of the invention, the format detection unit 130 divides the detection zone into a plurality of sub-zones and calculates eigenvalues of the sub-zones. Here, the eigenvalues are, for instance, brightness values, gradients, or calculated pixel eigenvalues of image pixels, which should not be construed as limitations to the invention. According to the eigenvalues of the sub-zones, the format detection unit 130 determines the image format of the video contents. For instance, the format detection unit 130 determines whether the image format of the video contents refers to the SBS format by detecting the similarity between the left half and the right half of the detection zone of the single frame image. In another aspect, the format detection unit 130 may also determine whether the image format of the video contents refers to the TB format by detecting the similarity between the upper half and the lower half of the detection zone of the single frame image. In view of different image formats, a person skilled in the pertinent art is able to make proper modifications and changes, such that the image format of the video contents can be determined.

In step S240, the processing and driving unit 140 adjusts a play mode of the display apparatus 10 according to the image format and controls the display panel 110 to display the video contents which are scaled in the play mode. That is, after the image format of the video contents is determined, the processing and driving unit 140 adjusts the play mode of the display apparatus 10 and drives the display panel 110 to display image frames according to the play mode. Thereby, the user of the display apparatus 10 is able to receive the information from the video contents through the display apparatus 10. The display apparatus 10 can then display the video contents in an accurate manner or an expected manner after the image format of the video contents is determined.

It should be mentioned that the invention may be carried out in other manner than those described in the previous embodiments, and proper modifications to the previous embodiments may be made according to actual demands. For instance, the step of adjusting the play mode of the display apparatus may be changed to a step of spontaneously switching the play mode. In another embodiment, the play mode may also be adjusted according to a user's command. Additionally, the display apparatus described herein may also switch the 3D play mode to the 2D play mode (or vice versa) in response to a user's command, which will be further elaborated hereinafter.

Figure 4:
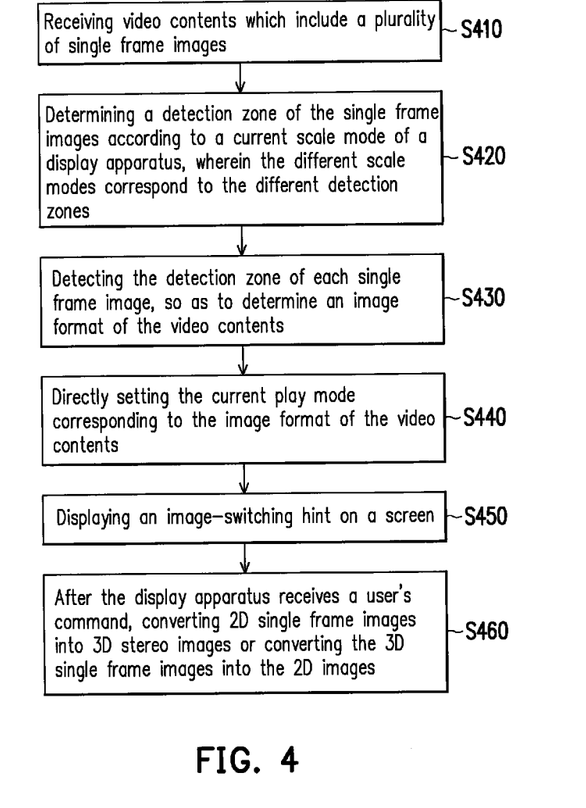
FIG. 4 is a flowchart of an image display method according to an embodiment of the invention.

FIG. 4 is a flowchart of an image display method according to an embodiment of the invention. With reference to FIG. 1 and FIG. 4, the image display method described in the present embodiment is applicable to the display apparatus 10, and detailed steps of the image display method are described hereinafter with reference to components in the display apparatus 10.

In step S410, the front-end image processing unit 120 receives the video contents which include a plurality of single frame images. In step S420, the format detection unit 130 determines a detection zone of the single frame images according to a current scale mode of the display apparatus 10; here, the different scale modes correspond to the different detection zones. In step S430, the format detection unit 130 detects the detection zone of each single frame image, so as to determine an image format of the video contents. At this time, the categorization of the image format as detected by the format detection unit 130 may be the group 1 shown in Table 1, and thereby whether the image format of the video contents refers to the 2D image format or the 3D image format may be determined. In step S440, the processing and driving unit 140 directly sets the current play mode corresponding to the image format of the video contents. Apparently, the conversion of the play mode described in the present embodiment is done in a spontaneous manner, i.e., after the display apparatus 10 receives the video contents, the display apparatus 10 spontaneously detects the image format of the video contents and spontaneously switch the current play mode to the play mode corresponding to the detected image format. For instance, in case that the display apparatus 10 support both the 2D image format and the 3D image format, the display apparatus 10 may spontaneously and properly adjust the current play mode to the 2D play mode or the 3D play mode according to the detection result, and the user is not required to issue additional operation commands.

In step S450, the display panel 110 displays an image-switching hint on a screen, e.g., the image-switching hint may be displayed by means of an on-screen display (OSD). Simply put, in an exemplary embodiment of the invention, after the display apparatus 10 spontaneously adjusts the current play mode to a proper play mode, the OSD displays the image-switching hint and inquires whether the user intends to convert the 3D stereo image into a 2D image (or convert the 2D image into a 3D stereo image). In step S460, after the display apparatus 10 receives the user's command, the processing and driving unit 140 converts the 2D single frame images into the 3D stereo images or converts the 3D single frame images into the 2D images. The user may issue the switching command to the display apparatus 10 by means of a remote control of the display apparatus 10, for instance. According to the image format of the video contents, the processing and driving unit 140 is able to convert the 2D single frame images into the 3D stereo images or convert the 3D single frame images into the 2D images through performing a proper image processing method, such that the user is allowed to watch the video contents based on personal preferences.

Figure 5:
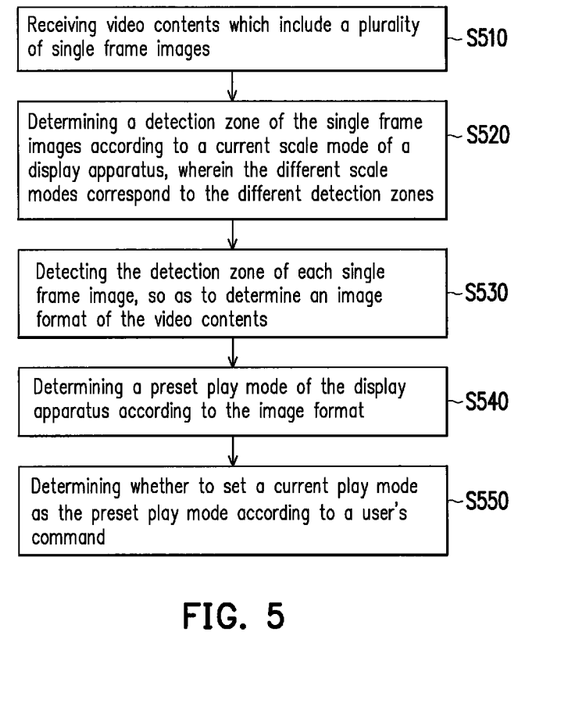
FIG. 5 is a flowchart of an image display method according to an embodiment of the invention.

FIG. 5 is a flowchart of an image display method according to an embodiment of the invention. With reference to FIG. 1 and FIG. 5, the image display method described in the present embodiment is applicable to the display apparatus 10, and detailed steps of the image display method are described hereinafter with reference to components in the display apparatus 10. In step S510, the front-end image processing unit 120 receives the video contents which include a plurality of single frame images. In step S520, a detection zone of the single frame images is determined according to a current scale mode of the display apparatus, and the different scale modes correspond to the different detection zones. In step S430, the format detection unit 130 detects the detection zone of each single frame image, so as to determine an image format of the video contents. The steps S510 to S530 are similar to the steps S410 to S430 described in the embodiment shown in FIG. 4 and thus will not be further explained.

Different from the previous embodiment, the present embodiment discloses that the processing and driving unit 140 in step S540 determines a preset play mode of the display apparatus 10 according to the image format. That is, after the format detection unit 130 determines the image format of the video contents, the processing and driving unit 140 determines a play mode corresponding to the image format as the preset play mode. For instance, if the image format of the video contents is the SBS format in the 3D image format category, the preset play mode is the SBS play mode; if the image format of the video contents is the 2D image format, the preset play mode is the 2D play mode. In step S550, the processing and driving unit 140 determines whether to set the current play mode as the preset play mode according to a user's command. For instance, if the user's command indicates the use of the preset play mode, the current play mode of the display apparatus 10 is set as the preset play mode; on the contrary, if the user's command indicates no use of the preset play mode, the current play mode of the display apparatus 10 stays unchanged. After said adjustment, the display apparatus 10 in the adjusted play mode displays the video contents. Namely, in the present embodiment, the display apparatus 10 does not spontaneously switch the current play mode into the play mode corresponding to the image format but adjusts the play mode according to the user's command, such that the image format detection method may be flexibly applied to image display systems or display apparatuses.

Figure 6:
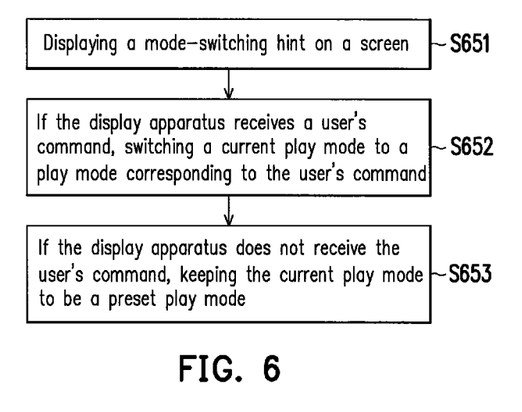
FIG. 6 is a detailed flowchart of a step S550 shown in FIG. 5.

FIG. 6 is a detailed flowchart of the step S550 shown in FIG. 5. In brief, FIG. 6 illustrates the detailed steps of using the display apparatus 10 to adjust the play mode according to a user's command. As discussed above, the format detection unit 130 determines the image format of the video contents, and the processing and driving unit 140 determines a play mode corresponding to the image format as the preset play mode. With reference to FIG. 6. in step S651, the display panel 110 displays a mode-switching hint on a screen, e.g., the mode-switching hint may be displayed by means of an OSD. In particular, if the current play mode is a 2D play mode, and the image format is the 3D image format, the mode-switching hint displayed by means of the OSD inquires the user about whether to switch to the 3D play mode. In step S652, if the display apparatus 10 receives the user's command, the processing and driving unit 140 switches the current play mode to the play mode corresponding to the user's command. On the other hand, in step S653, if the display apparatus 10 does not receive the user's command, the processing and driving unit 140 keeps the current play mode to be the preset play mode. That is, if the user does not respond to the mode-switching hint displayed by means of the OSD, the display apparatus 10 does not change the current play mode.

Figure 7:
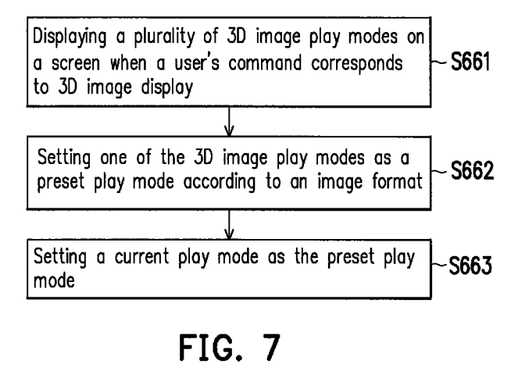
FIG. 7 is a detailed flowchart of the step S550 shown in FIG. 5.

FIG. 7 is a detailed flowchart of the step S550 shown in FIG. 5. With reference to FIG. 7, the display apparatus described herein also adjusts the play mode according to a user's command, while the difference between the present embodiment and the previous embodiment lies in that the display 110 displays a plurality of 3D image play modes by means of the OSD in step S661 when the user's command corresponds to the 3D image display. That is, if the user has no intention to watch the 2D image but intends to watch the 3D stereo images, the user may issue the user's command corresponding to the 3D image display, such that the display panel 100 may display the 3D image play modes through the OSD. Here, the 3D image play modes displayed by means of the OSD may be applicable to any one of the groups 2 to 4 shown in Table 1. In step S662, the processing and driving unit 140 sets one of the 3D image play modes as the preset play mode according to the image format. In step S663, the processing and driving unit 140 sets the current play mode as the preset play mode. For instance, the user may click on the 3D play mode button to issue the user's command corresponding to the 3D image display, and a menu including plural 3D image formats is displayed by means of the OSD. According to the determined image format, the processing and driving unit 140 selects one of the closest or most proper play modes from the 3D image play modes and sets the selected play mode as the preset play mode. That is, the processing and driving unit 140 sets the current play mode as the preset play mode in order to properly display the video contents. Since the 3D play mode is determined in the beginning, the format detection unit 130 is able to rapidly determine the image format of the video contents and thereby determine the preset play mode.

No matter whether the play mode is adjusted spontaneously or according to the user's command, after the video contents are displayed, the display apparatus can convert the 3D image format into the 2D image format (or convert the 2D image format into the 3D image format) according to the user's command.

From another perspective, displaying the 3D image has a requirement for scale mode; if a 3D stereo image is scaled at will, the displayed 3D image may discomfort the user, or satisfactory stereo effects of the 3D image cannot be achieved. Accordingly, the image display method described herein may further include a step of controlling the front-end image processing unit to adjust the scale mode according to the image format corresponding to the video contents. As described above, the format detection unit may detect the video contents which have undergone different scaling process, so as to determine an image format of the video contents. To be specific, there is a transmission interface between the front-end image processing unit (e.g., the front-end image processing unit 120) and the format detection unit (e.g., the format detection unit 130), and the front-end image processing unit may inform the format detection unit of the current scale mode through the transmission interface. Thereby, the format detection unit may detect the detection zone according to the current scale mode. After that, when the format detection unit determines the image format of the video contents to be the 3D image format, the format detection unit informs the front-end image processing unit of maintaining the current scale mode or adjusting the current scale mode to a dot-by-dot scale mode which is most suitable for watching 3D stereo images.

To sum up, according to the image display method described herein, the scale mode may be correspondingly adjusted after the image format corresponding to the video contents is spontaneously determined. Thereby, the display apparatus may display the 3D stereo images or the 2D images as expected by the user, and the user is not required to perform any complicated and inflexible operation process. Moreover, the detection result obtained by spontaneously detecting the image format according to the image display method described herein may be applied to further control other image processing processes, such that the user is allowed to promptly watch the images with ease.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. An image display method of a display apparatus, comprising:
   receiving video contents, the video contents comprising a plurality of frame images;

scaling the frame images according to a current aspect ratio of the display apparatus;

determining position and dimension of a detection zone for the frame images according to the current aspect ratio of the display apparatus, wherein each of different aspect ratios of the display apparatus results in a corresponding arrangement of the detection zone, setting four corner areas of each of the frame images as the detection zone when the current aspect ratio is at an 16:9 aspect ratio, and wherein the four corner areas are spatially separated;

detecting image content in the detection zone for at least one of the frame images to determine an image format of the video contents; and adjusting a current play mode of the display apparatus according to the image format such that the video contents are displayed by the display apparatus in an adjusted play mode, wherein the video contents are scaled and then displayed.

2. The image display method as recited in claim 1, wherein the step of adjusting the current play mode of the display apparatus according to the image format comprises:

spontaneously switching the current play mode to the adjusted play mode, in response to the image format being determined.

3. The image display method as recited in claim 1, wherein the step of adjusting the current play mode of the display apparatus according to the image format comprises:

determining a preset play mode of the display apparatus according to the image format; and determining whether to set the current play mode as the preset play mode according to a user's command.

4. The image display method as recited in claim 3, wherein the step of determining whether to set the current play mode as the preset play mode according to the user's command comprises:

displaying a mode-switching hint on a screen;

if the display apparatus receives the user's command, switching the current play mode to the adjusted play mode corresponding to the user's command; and if the display apparatus does not receive the user's command, keeping the current play mode of the display apparatus to be the preset play mode.

5. The image display method as recited in claim 3, wherein the step of determining whether to set the current play mode as the preset play mode according to the user's command comprises:

when the user's command corresponds to three-dimensional image display, displaying a plurality of three-dimensional image play modes on a screen;

setting one of the three-dimensional image play modes as the preset play mode according to the image format; and setting the current play mode as the preset play mode.

6. The image display method as recited in claim 3, further comprising:

displaying an image-switching hint on a screen; and after the display apparatus receives the user's command, converting two-dimensional frame images of the frame images into three-dimensional images or converting three-dimensional frame images of the frame images into two-dimensional images.

7. The image display method as recited in claim 1, further comprising:

adjusting the current aspect ratio according to the image format corresponding to the video contents.

8. The image display method as recited in claim 1, wherein the step of determining the detection zone of the frame images further comprises:

when the current aspect ratio is at a 4:3 aspect ratio, setting a central area of each of the frame images as the detection zone; and when the current aspect ratio is a dot-by-dot scale mode, setting all areas of each of the frame images as the detection zone.

9. The image display method as recited in claim 1, wherein the step of detecting the image content in the detection zone for at least one of the frame images to determine the image format of the video contents comprises:

dividing the detection zone into a plurality of sub-zones and calculating eigenvalues of the sub-zones based on individual one of the sub-zones; and determining the image format of the video contents according to the eigenvalues of the sub-zones.

10. A display apparatus comprising:

a display panel for displaying the video contents;

a front-end image processing unit receiving the video contents, wherein the video contents comprise a plurality of frame images, and the front-end image processing unit scales the frame images according to a current aspect ratio of the display apparatus; and a format detection unit coupled to the front-end image processing unit, the format detection unit determining position and dimension of a detection zone for the frame images according to the current aspect ratio of the display apparatus, wherein each of different aspect ratios of the display apparatus results in a corresponding arrangement of the detection zone, setting four corner areas of each of the frame images as the detection zone when the current aspect ratio is at an 16:9 aspect ratio, wherein the four corner areas are spatially separated, and the format detection unit detects image content in the detection zone for at least one of frame images to determine an image format of the video contents; and a processing unit coupled to the format detection unit and the display panel, the processing unit adjusting a current play mode of the display apparatus according to the image format such that the display panel of the display apparatus is driven to display the video contents in an adjusted play mode, wherein the video contents are scaled and then displayed.

11. The display apparatus as recited in claim 10, wherein the processing unit further spontaneously switches the current play mode to the adjusted play mode, in response to the image format being determined.

12. The display apparatus as recited in claim 10, wherein the processing unit further determines a preset play mode of the display apparatus according to the image format and determines whether to set the current play mode as the preset play mode according to a user's command.

13. The display apparatus as recited in claim 12, wherein the display panel displays a mode-switching hint on a screen, if the display apparatus receives the user's command, the processing unit switches the current play mode to the adjusted play mode corresponding to the user's command, and if the display apparatus does not receive the user's command, the processing unit keeps the current play mode of the display apparatus to be the preset play mode.

14. The display apparatus as recited in claim 12, wherein when the user's command corresponds to three-dimensional image display, the display panel displays a plurality of three-dimensional image play modes on a screen, and the processing unit sets one of the three-dimensional image play modes as the preset play mode according to the image format and sets the current play mode as the preset play mode.

15. The display apparatus as recited in claim 10, wherein the display panel displays an image-switching hint on a screen, and after the display apparatus receives the user's command, the processing unit converts two-dimensional frame images of the frame images into three-dimensional images or converts three-dimensional frame images of the frame images into two-dimensional images.

16. The display apparatus as recited in claim 10, wherein the format detection unit adjusts the current aspect ratio according to the image format corresponding to the video contents.

17. The display apparatus as recited in claim 10, wherein when the current aspect ratio is at a 4:3 aspect ratio, the format detection unit sets a central area of the frame images as the detection zone, and when the current aspect ratio is a dot-by-dot scale mode, the format detection unit sets all areas of each of the frame images as the detection zone.

18. The display apparatus as recited in claim 10, wherein the format detection unit divides the detection zone into a plurality of sub-zones and calculates eigenvalues of the sub-zones based on individual one of the sub-zones, and the format detection unit determines the image format of the video contents according to the eigenvalues of the sub-zones.

* * * * *